United States Patent
Lilley et al.

(10) Patent No.: US 9,610,586 B2
(45) Date of Patent: Apr. 4, 2017

(54) SYSTEMS FOR TRANSPORTING AND COLLECTING WASTE

(71) Applicant: Simplavate, Surprise, AZ (US)

(72) Inventors: Daniel R Lilley, Surprise, AZ (US); Clyde L Witham, Saratoga Springs, UT (US)

(73) Assignee: SIMPLAVATE, Surprise, AZ (US)

( * ) Notice: Subject to any disclaimer, the term of this patent is extended or adjusted under 35 U.S.C. 154(b) by 0 days.

(21) Appl. No.: 14/997,218

(22) Filed: Jan. 15, 2016

(65) Prior Publication Data

US 2016/0206166 A1    Jul. 21, 2016

Related U.S. Application Data

(60) Provisional application No. 62/103,834, filed on Jan. 15, 2015.

(51) Int. Cl.
| | |
|---|---|
| *A47L 9/10* | (2006.01) |
| *A47L 9/16* | (2006.01) |
| *B03C 3/00* | (2006.01) |
| *A47L 9/14* | (2006.01) |
| *B08B 6/00* | (2006.01) |

(Continued)

(52) U.S. Cl.
CPC ............. *B03C 3/00* (2013.01); *A47L 7/0047* (2013.01); *B65F 5/005* (2013.01); *B65G 53/04* (2013.01)

(58) Field of Classification Search
CPC .......... A47L 9/102; A47L 9/2889; A47L 9/14; A47L 9/1683; A47L 7/0047; B08B 6/00; B08C 3/00; B65F 5/005; B65G 53/04
See application file for complete search history.

(56) References Cited

U.S. PATENT DOCUMENTS

| | | | | |
|---|---|---|---|---|
| 3,027,588 A | * | 4/1962 | Bierstock .................. | A47L 5/38 15/301 |
| 5,408,721 A | * | 4/1995 | Wall .......................... | A47L 5/38 15/301 |

(Continued)

OTHER PUBLICATIONS

MyCentralVacuum.Com—Central Vacuum Tools, Parts, & Accessories, accessed Feb. 3, 2016, http://mycentralvacuum.com/product/sweep-away/.

(Continued)

*Primary Examiner* — Dung Van Nguyen
(74) *Attorney, Agent, or Firm* — Workman Nydegger

(57) ABSTRACT

A system for transporting and collecting waste is disclosed. The system comprises a waste disposal bay comprising a front side, a bottom side, and a back side, wherein the back side includes an opening. The system further comprises a movable receptacle positioned above the waste disposal bay configured to translocate from a first position to a second position and back again, and wherein the movable receptacle comprises a through hole. The system further comprises a vacuum system associated with the through hole of the movable receptacle, comprising a motor for generating suction and a removable container for collecting waste; an attachment mechanism between the opening of the back side and the through hole, wherein the attachment mechanism is configured to maintain fluid communication between the opening and the vacuum system when the movable receptacle is in the first position; and a switch configured to activate the motor.

20 Claims, 5 Drawing Sheets

(51) Int. Cl.
*A47L 9/28* (2006.01)
*A47L 7/00* (2006.01)
*B65G 53/04* (2006.01)
*B65F 5/00* (2006.01)

(56) References Cited

U.S. PATENT DOCUMENTS

| | | | | |
|---|---|---|---|---|
| 5,655,253 A * | 8/1997 | Nevin | ............... | A47L 7/00 |
| | | | | 15/310 |
| 6,108,858 A * | 8/2000 | Smith | ............... | A47L 5/38 |
| | | | | 15/301 |
| 6,286,177 B1 * | 9/2001 | Robinson | ............ | A47L 5/38 |
| | | | | 15/301 |
| 6,671,924 B1 | 1/2004 | Rood | | |
| 7,096,532 B2 | 8/2006 | Rood | | |
| 7,356,872 B2 * | 4/2008 | Jones | ............... | A47L 5/38 |
| | | | | 15/310 |
| 8,938,849 B2 * | 1/2015 | Cleary | ............ | A47L 7/0047 |
| | | | | 15/301 |

OTHER PUBLICATIONS

Sockelsauger, Under-Furniture Vacuum Cleaner, accessed Jul. 28, 2015, http://www.gronbach.com/en/products/appliances/furniture-vacuum-cleaner.html.

* cited by examiner

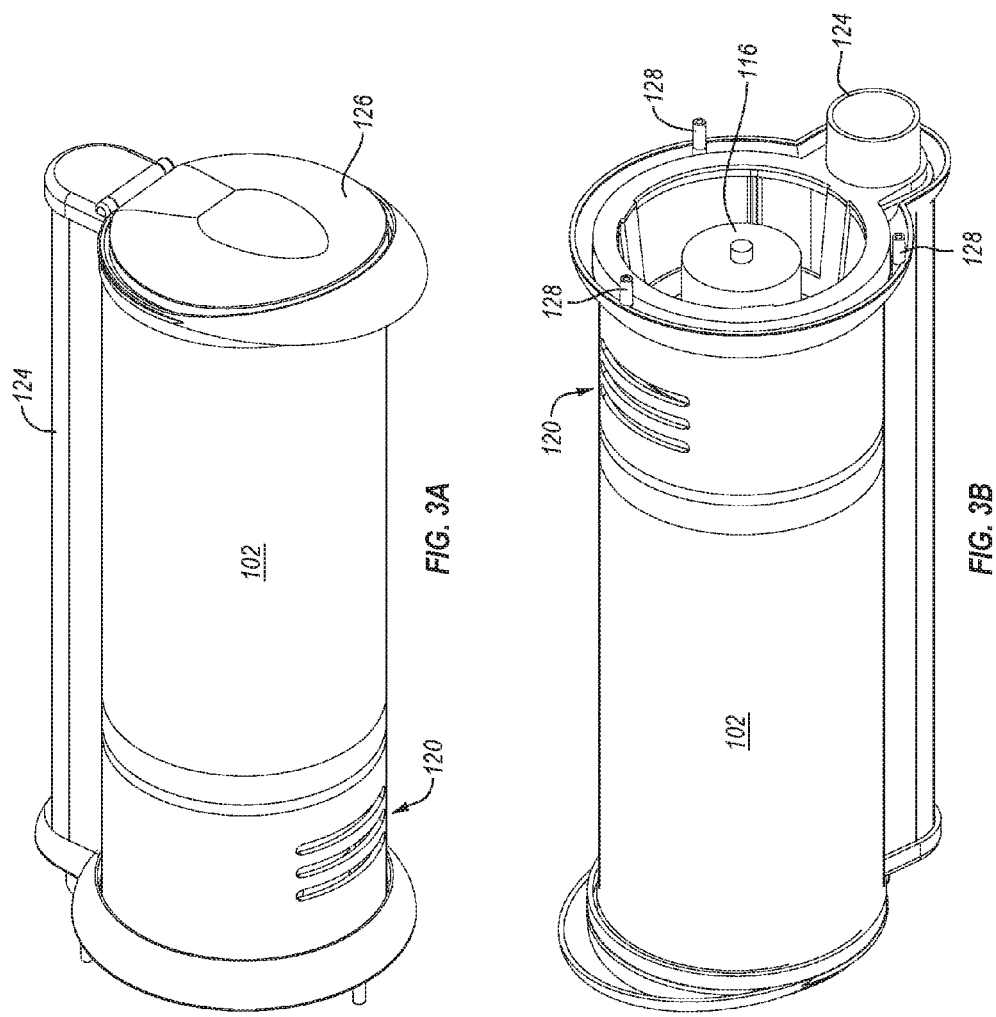

SYSTEMS FOR TRANSPORTING AND COLLECTING WASTE

CROSS-REFERENCE TO RELATED APPLICATIONS

This application claims priority to U.S. Provisional Application No. 62/103,834, filed Jan. 15, 2015, and entitled AUTOMATIC DUSTPAN, which is incorporated herein in its entirety by reference.

BACKGROUND

1. Technical Field

The present disclosure relates generally to the transportation and collection of waste. Specifically, the present disclosure is generally directed to the transportation and collection of waste via vacuum systems.

2. Background and Relevant Art

Whether in an industrial, commercial, or domestic setting, maintaining a clean environment is desirable. Doing so helps minimize potential hazards and has a positive effect on the health of individuals within said space. For example, dust, dirt, and debris often accumulate over time, and absent their routine collection and disposal, individuals exposed thereto may be subject to harmful debris (e.g., sharp objects such as broken glass, nails, shards of metal, etc.), or to allergens and pathogenic microbes found in the accumulated dust or dirt. At the very least, it creates an unsightly and/or unaesthetic environment.

With respect to dust, dirt, and debris on the floor of an industrial or commercial workspace, workers may be caused to trip, slip, stumble, and/or injure themselves by stepping on debris, dirt, and/or accumulated dust. It may further cause inefficiencies or errors in industrial workflows and/or machinery. In a domestic environment, accumulated dust may cause excessive sneezing or may contribute to allergies of residents and/or visitors. Dirt and debris is unsightly in such a setting but may further represent a choking hazard for small children scooting about the floor or may even become a food source for unwanted insects and/or vermin. Accordingly, methods and systems for collecting and transporting waste (e.g., dust, dirt, debris, etc.) are needed.

There are some rudimentary systems for collecting and transporting waste found on the floors of industrial, commercial, and residential spaces. For example, a broom and dustpan may be used to sweep the waste into a pile after which the pile is collected into a dustpan for disposal in a waste receptacle. However, there are a host of problems and inefficiencies with this type of waste collection, transportation, and disposal. For example, a broom and dustpan requires a certain level of dexterity to manage the transfer of waste into the dustpan, and this process is typically inefficient. Vacuum cleaners and vacuum systems may also be used to collect and transport waste but they also suffer from drawbacks.

Accordingly, there are a number of disadvantages in the art of collecting and transporting waste that can be addressed.

BRIEF SUMMARY

Implementations of the present disclosure comprise systems and kits for transporting and collecting waste. In particular, implementations of the present disclosure comprise methods and systems for a waste disposal system that comprises a waste disposal bay connected to a vacuum system through an attachment mechanism. For example, implementations of the present disclosure comprise systems and kits that include the vacuum system being associated with a movable receptacle, more specifically with a through hole of the movable receptacle, wherein the movable receptacle is configured to translocate from a first position to a second position and back to the first position. Additionally, implementations of the present disclosure include the through hole of the movable receptacle interfacing with the attachment mechanism, and the attachment mechanism is configured to maintain fluid communication between the waste disposal bay and the vacuum system when the movable receptacle is in the first position.

In at least one embodiment of the present disclosure, the waste disposal bay of the waste transportation and collection system is connected to the vacuum system through a discontinuous pipe, the discontinuity being bridged by a seal configured to maintain fluid communication between the waste disposal bay and the vacuum system. In one embodiment, the discontinuous pipe is aligned or substantially aligned to form a substantially airtight seal, and the substantially airtight seal can be selectively broken if the discontinuous pipe is not substantially aligned.

Additional features and advantages of exemplary implementations of the disclosure will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above recited and other advantages and features of the disclosure can be obtained, a more particular description of the disclosure briefly described above will be rendered by reference to specific embodiments thereof, which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which:

FIGS. 3A-3B illustrate schematic representations of a vacuum system according to one implementation of the present disclosure.

DETAILED DESCRIPTION

Figure 1:
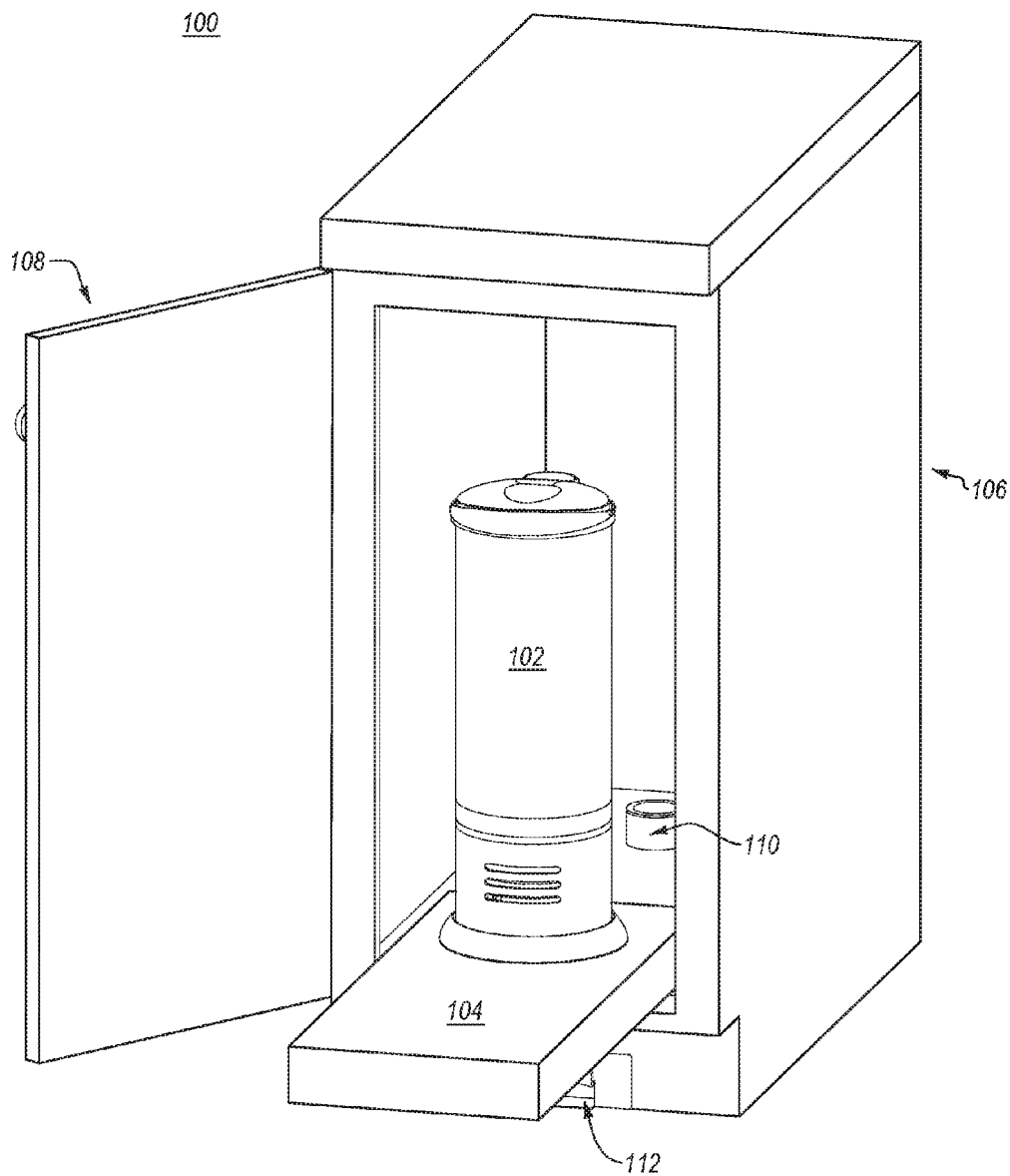
FIG. 1 illustrates a schematic representation of a system for transporting and collecting waste according to one implementation of the present disclosure.

Implementations of the present disclosure comprise systems and kits for transporting and collecting waste. In particular, implementations of the present disclosure comprise methods and systems for a waste disposal system that comprises a waste disposal bay connected to a vacuum system through an attachment mechanism. For example, implementations of the present disclosure comprise systems and kits that include the vacuum system being associated with a movable receptacle, more specifically with a through hole of the movable receptacle, wherein the movable receptacle is configured to translocate from a first position to a second position and back to the first position. Additionally, implementations of the present disclosure include the through hole of the movable receptacle interfacing with the attachment mechanism, and the attachment mechanism is configured to maintain fluid communication between the waste disposal bay and the vacuum system when the movable receptacle is in the first position.

Accordingly, implementations of the present disclosure provide a system to more easily dispose of waste on the floor of an industrial, commercial, and/or residential space, including, more particularly, floors of residential kitchens. The systems and kits described herein make it possible, for example, to provide a residential kitchen with all the benefits of a central vacuum unit while avoiding the costs and pitfalls of installing or retrofitting a home with an entire central vacuum system.

Existing systems do not provide an efficient waste removal system for floors of industrial, commercial, and/or residential spaces that combines ease of access to the waste collection container while minimizing aesthetic disturbances to the serviceable area. There are, for example, many systems available for cleaning the floors of an industrial, commercial, and/or residential area. The most basic example is perhaps a traditional broom and dustpan. Brooms may quickly gather distributed dust, dirt, and debris from a floor into a pile, but brooms have no means of themselves to transport that collected material to a waste receptacle. Typically, the operator of the broom will sweep the collected waste into a dustpan, and then dump the transported contents into a waste receptacle. The problems inherent within this system are that the user is required to repeatedly bend over and perform the unnatural, dexterous feat of manipulating a long-handled broom with one hand while simultaneously positioning the dustpan at a sufficient angle to capture waste as it is swept into the dustpan while also maintaining sufficient downward pressure so as to prevent waste from slipping beneath the dustpan as it is swept by the broom. Multiple attempts are usually required to get the majority of waste into the dustpan, but even the most dedicated broom and dustpan handler leaves a modicum of waste on the floor that, for whatever reason, refuses to associate with the dustpan.

Compounding the issue of transporting waste from the floor to a dustpan, many floors are uneven or not completely uniform. For example, many floors are tiled, and the grout adjoining the tiles is typically at a lower elevation, even if slightly, than the tiles themselves. This is problematic for the utilization of a dustpan because dustpans typically have straight, planar edges and are often of sufficient size that when placed on the ground, the dustpan's waste receiving edge may span more than the length of a given tile, extending over the grout. If, when sweeping waste into the dustpan, the dustpan is in a configuration where it extends over grout, some of the waste may enter the gap between the dustpan and the grout, slipping beneath the dustpan instead of being transferred therein by the broom. This can make for a frustrating and time consuming process.

Additional frustrations exist with the broom and dustpan paradigm. Even assuming a user can get a satisfactory amount of waste moved from the floor to the dustpan, transferring the waste to a waste receptacle may prove problematic. The larger debris may readily fall into the receptacle, but smaller particles often cling to the dustpan, being difficult to dispose of. Users may attempt to encourage the smaller particles to fall off the dustpan and into the waste receptacle by striking the dustpan against the inside of the waste receptacle, but the smaller particles typically remain adherent to the dustpan or else become airborne to drift slowly to the floor to be swept up again at a later time. Hence, the broom and dustpan paradigm is fraught with inefficiencies and frustrations.

One other example of systems for transporting and collecting waste from floors is a vacuum system. For example, portable vacuum systems are commonplace in residential housing. The majority of these residential vacuum systems are used for removing waste from carpets or other flooring materials but are not often used for removing waste from non-carpeted surfaces (e.g., tile, linoleum, hardwood, etc.). The roller brush inherent to most portable vacuum systems is ineffective on hard surfaces, acting more to fling debris about than to aid in its retrieval by the system's suction. Further, a rotating brush may be harsh on a hardwood floor and would, therefore, not be used on such a surface.

Even with a disabled rotating brush, the typical portable vacuum system lacks the efficiency of a traditional broom and is problematic to store. If stored in the open, the portable vacuum system is more accessible, but it becomes an eyesore and takes up what is potentially valuable floor space. If stored out of sight, the portable vacuum system is less accessible, increasing the time and energy required to collect the waste scattered about the floor. This may be enough, in certain circumstances, to dissuade a user from carrying out the task of sweeping the floor in the first place.

Integrated or central vacuum systems are also inefficient waste removal systems that suffer from some drawbacks. A central vacuum systems consists of a centrally located stationary vacuum with tubes that extend throughout the serviceable building. The tubes end at various waste pickup stations where a hose or portal is provided that allows for vacuum suction at each of the stations, the waste traversing the intricate tubing system to finally rest at or near the distant vacuum system. One or more of these fixed stations can be a receptacle for sweeping material from the floor with a broom into the vacuum system. This fixed station is convenient because no dustpan or receptacle for disposing of debris swept from the floor is needed. However, there are drawbacks to such systems.

For example, it is difficult and sometimes impossible to retrofit a location with a central vacuum system. Because these systems rely on a centrally located vacuum with tentacle like tubes extending to remote parts of the building by snaking through interior walls and ceilings, most central vacuum systems are installed as part of the initial construction process or as part of an extensive remodeling project. Regardless of whether the central vacuum system is installed during initial construction of a building or retrofitted thereafter, it is an expensive addition. Further, the additional distance, twists, and turns in vacuum tubing that are required by central vacuum systems to reach interior spaces may substantially reduce the suction power provided by the vacuum motor and can make it difficult to clear blockages and/or clogs in the system.

The foregoing are illustrative of the drawbacks associated with current systems and emphasize the need for improvements and innovations in the art of transportation and collection of waste, more particularly in the art of vacuum systems. Implementations of the present disclosure alleviate problems associated with dustpans, portable vacuum cleaners, and central vacuum systems while simultaneously providing additional benefits.

For example, FIG. 1 illustrates a schematic representation of a system 100 for transporting and collecting waste according to one implementation of the present disclosure. In one embodiment, and as pictured in FIG. 1, the system 100 includes a vacuum system 102 associated with a movable receptacle 104 and is housed within an enclosure 106, which may in some embodiments include a closable door 108. The system may further include an attachment mechanism 110 and a waste disposal bay 112. Also depicted in FIG. 1, and consistent with embodiments of the present disclosure, the movable receptacle 104 may be extended outside the enclosure 106. In such a configuration, the vacuum system may be dislocated from the attachment mechanism 110, but when recessed within the enclosure 106 (as depicted in FIG. 2A), the attachment mechanism may create and maintain fluid communication between the waste disposal bay 112 and the vacuum system 102 such that upon activation of the vacuum system motor, waste is transported from the waste disposal bay and collected within the vacuum system 102.

Figure 2A:
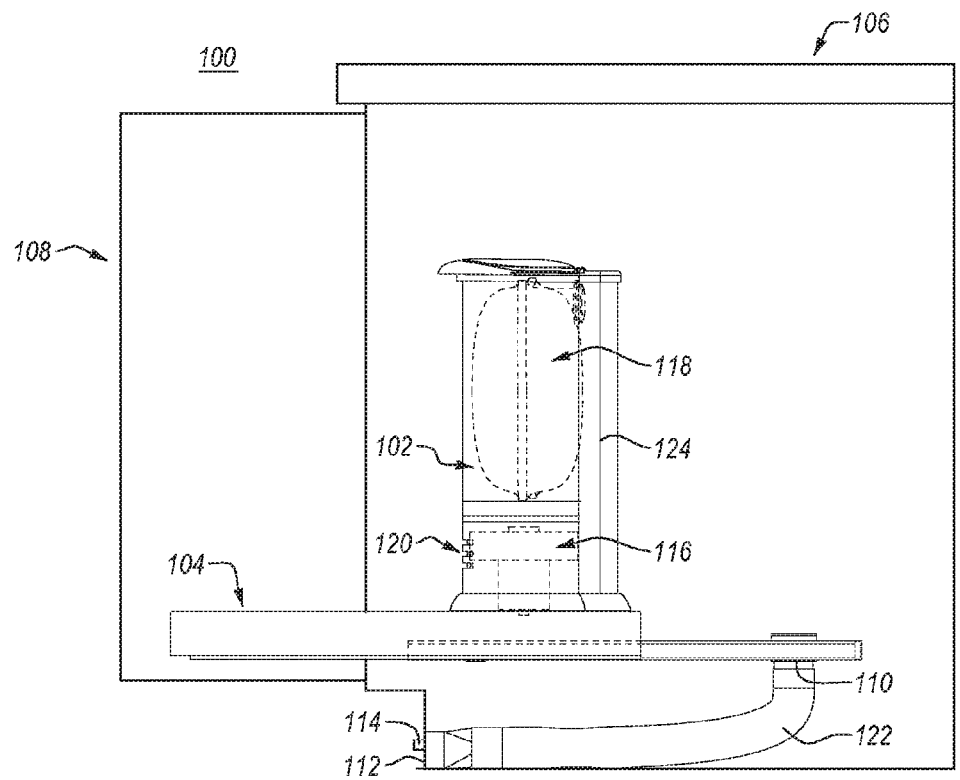
FIG. 2A illustrates a cross sectional profile view of a system for transporting and collecting waste with the movable receptacle extended, according to one implementation of the present disclosure.
Figure 2B:
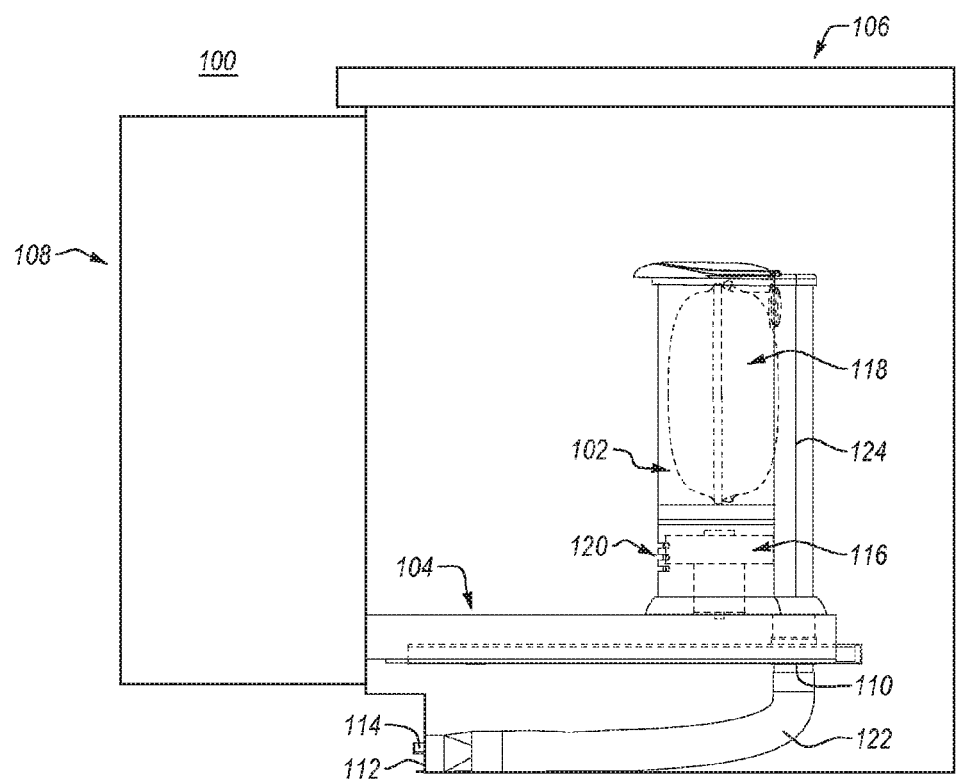
FIG. 2B illustrates a cross sectional profile view of a system for transporting and collecting waste with the movable receptacle retracted, according to one implementation of the present disclosure.

FIGS. 2A and 2B illustrate cross sectional profile views of system 100 with the movable receptacle 104 extended in FIG. 2A and retracted in FIG. 2B, according to implementations of the present disclosure. As depicted between FIGS. 2A and 2B, the movable receptacle 104 is configured to translocate from a first position (depicted in FIG. 2B) to a second position and from the second position to the first position. In a first position, the attachment mechanism 110 generates fluid communication between the waste disposal bay 112 and the vacuum system 102. The second position may represent any position of the movable receptacle 104 wherein the attachment mechanism 110 cannot generate fluid communication between the waste disposal bay 112 and the vacuum system 102. For example, the locations of the movable receptacle 104 in both FIGS. 1 and 2A are exemplary of a second position where the attachment mechanism cannot generate fluid communication between the waste disposal bay 112 and the vacuum system 102. It should be appreciated that the positions depicted in FIGS. 1 and 2 are not the only position which could satisfy a first and second position as understood in the current application.

The system 100 depicted in FIGS. 1 and 2 may, in some embodiments, be designed as a floor waste pickup system for use in residential kitchens. As an example implementation of this, waste may be swept and gathered from the floor into a pile in front of the waste disposal bay 112. A switch 114 may be activated to turn on the motor 116 of the vacuum system 102, which may generate sufficient suction to pick up the waste deposited at or near the waste disposal bay 112. Waste picked up by the air flow created by suction from the vacuum motor 116 may be conveyed from the waste disposal bay 112 through lower channel 122, through the attachment mechanism 110, through upper channel 124, and collected within a removable container for collecting waste 118 associated with vacuum system 102.

In some embodiments, waste may be removed from the flowing air by collecting in a waste disposal bay, which in some embodiments may be accomplished using a particle collector such as, for example, a filter bag, a cyclone, electrostatic precipitator, impactor, scrubber, drop out container, or other particle collectors known in the art of vacuum systems. In some embodiments, cleaned air coming from the waste disposal bay may pass through a secondary filter to protect the vacuum motor from particle collector failure. The secondarily cleaned air may then pass through an opening in the vacuum system similar to that illustrated by vent 120 in FIGS. 1-3.

The systems as previously described may provide certain benefits. For example, the vacuum system 102 and the waste disposal bay 112 may be located in closer proximity to one another than they otherwise would be in a central vacuum system. In general, the shorter the distance between the source of suction and the waste disposal bay (i.e., the waste pickup location), the less potential loss of suction. In the configurations depicted in FIGS. 1 and 2, the suction power is likely to remain high with negligible loss. Additionally, the total length of tubing may be significantly shorter than that found in a central vacuum system, and this decreased distance may result in a lower chance of particulate blockages and reduced airflow or suction, and if blockages occur, the blockage may be easily accessed and removed.

In some embodiments, the enclosure 106 may be a kitchen cabinet, which may act to reduce the noise of an activated vacuum system 102 while simultaneously ensuring the vacuum system 102 is out of the way of foot traffic in the kitchen. Further, by housing the vacuum system within a kitchen cabinet, it maintains the aesthetics of the room without detracting from the decor. The present systems and kits may also be a less expensive, less intrusive solution than a central vacuum system.

With respect to movable receptacle 104, one skilled in the art will recognize that a movable receptacle can be incorporated in a number of ways such as hanging from the roof of the enclosure, sliding along the side of the enclosure, or by supporting the vacuum unit on rails that slide or pivot out of the enclosure. The drawings and descriptions provided herein are in no way intended to limit the format that could potentially be used to provide for a movable receptacle.

Referring now to FIGS. 3A-3B, illustrated are various viewpoints of schematic representations of vacuum system 102 according to implementations of the present disclosure. Vacuum system 102 includes a motor 116 for producing suction, which is located at the base of vacuum system and which is positioned proximate an air vent 120. The motor may, in some embodiments, be positioned at a location within the vacuum system where it is distal to the air vent. It should be noted that the relative position of the motor and air vent to one another are interchangeable. That is, in discussing the position of the motor with respect to the air vent (as done above) it is possible that the location of the air vent remains constant while the position of the motor within the vacuum system is moved. Additionally or alternatively, the position of the motor may be fixed with the position of the air vent within the vacuum system to describe locations of one element with respect to the other. It should be appreciated that the positioning of both the air vent and the motor may be dynamically changed with respect to one another.

The vacuum system 102 of FIG. 3A-3B also comprises a upper channel 124. The upper channel 124 directs and/or transports waste suctioned through the waste transportation and collection system to the removable container for collecting waste. The upper channel may be configured to fit on top of or within a through hole associated with the movable receptacle and interface with the attachment mechanism directly or indirectly.

Regardless of its orientation with respect to the attachment mechanism, the upper channel may be a mechanism by which waste is transported to the removable container for collecting waste. The removable container for collecting waste may, in some embodiments, be accessed through a lid 126. In some embodiments, the lid 126 includes a gasket to seal lid 126 which when opened provides access to the inside of the vacuum system for debris removal and cleaning and when closed provides an airtight seal.

The vacuum system 102 depicted in FIGS. 3A-3B may further include connecting structures 128 that can be inserted into complementary holes in the movable receptacle to stabilize and/or secure the vacuum system on the movable structure. The connecting structures may include internal threading to assist in the fixation (whether temporary or permanent) of the vacuum system to the movable receptacle. For example, the vacuum system may be placed on the movable receptacle, aligned with the movable receptacle such that three holes on the movable receptacle accommodate the connecting structures together and/or independent from a through hole to complement the upper channel. The vacuum system may be secured to the movable receptacle by screwing and/or bolting the vacuum system thereto. Additionally or alternatively, the connecting structures and/or the upper channel may be fixedly secured to the movable container by an epoxy, glue, cement, or other adhesive material.

Figure 4:
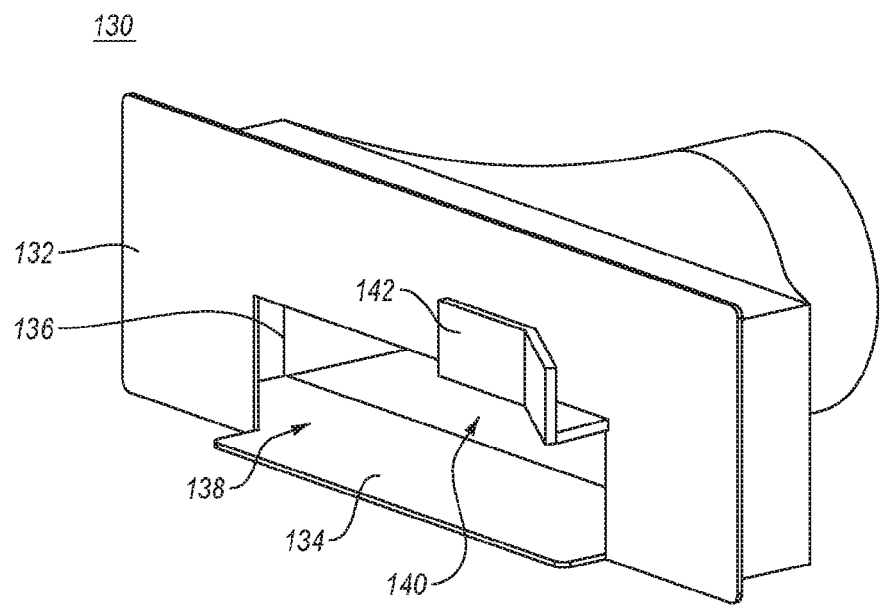
FIG. 4 illustrates a schematic representation of a waste disposal bay and switch according to one implementation of the present disclosure.

Referring now to FIG. 4, illustrated is a schematic representation of a waste disposal bay containing a switch 130 according to one implementation of the present disclosure. As depicted in FIG. 4, the waste disposal bay includes a front side 132, a bottom side 134, and a back side 136. The front side 132 extends vertically away from a floor and comprises an aperture 138. The aperture may in some embodiments comprise substantially the entire front side, and in other embodiments, the aperture comprises less than substantially the entire front side. The aperture may in some embodiments be selectively open.

For example, the aperture may be closed while no suction is being drawn through the aperture, but upon suction being generated by the waste transportation and collection system, the aperture may open. This may occur as a result of the aperture being a lightweight hinged door such that the suction may cause the hinged door to pull towards the source of suction. As an exemplary illustration of this concept, such an aperture may be hinged, the hinge connected on an upper edge such that gravity pulls the aperture closed when no suction is applied, and upon activation of the vacuum system, the suction is sufficient to overcome the gravitational pull on the aperture, causing it to swing back to open the waste disposal bay.

In one embodiment, the aperture may be hinged on a bottom edge or side edge and held closed with a lightly tensioned spring such that the suction generated by the vacuum system is sufficient to compress the spring and open the aperture. When the suction ceases, the aperture may close as a result of the tension-loaded spring discharging.

As seen in FIG. 4 and alluded to earlier, the waste disposal bay includes a bottom side 134. The bottom side 134 is depicted as being substantially level with the floor, but in some embodiments, the bottom side may be inclined or declined away from the surface of the floor. In some embodiments, the bottom side may include an opening for waste to be transported through the waste disposal bay for eventual depositing at the removable container for collecting waste. In some embodiments, the bottom side may be the floor, itself, or a portion of the bottom side may include the floor.

Figure 5:
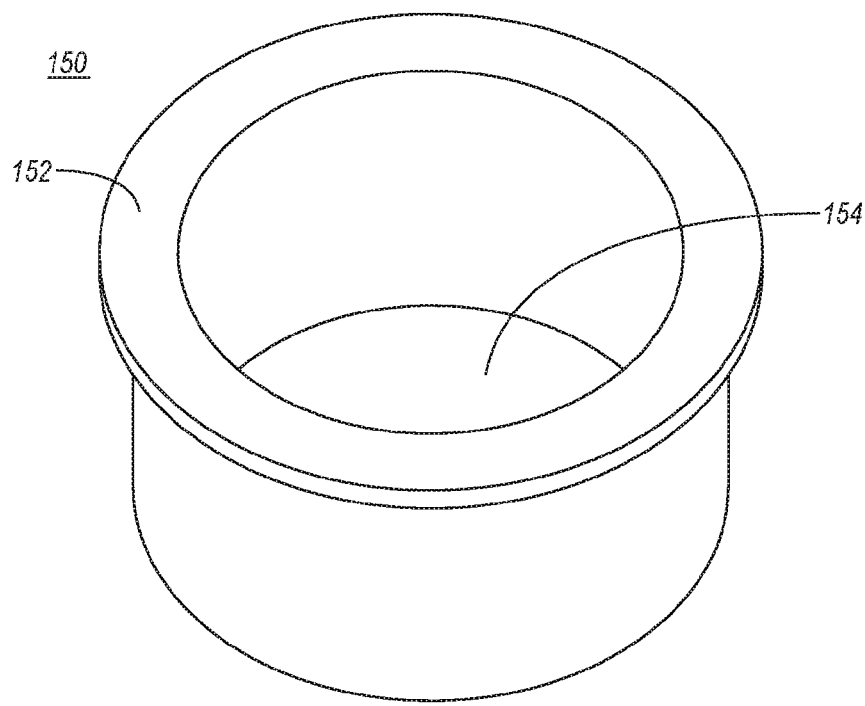
FIG. 5 illustrates a schematic representation of an attachment mechanism according to one implementation of the present disclosure.

As seen in FIG. 4 and alluded to earlier, the waste disposal bay may include a back side 136 disposed adjacent to the bottom side 134 and extending a distance away from the bottom side 134. In some embodiments, and as depicted in FIG. 5, the back side 136 includes an opening 140. The opening 140 connects the waste disposal bay to the lower channel. In some embodiments, the opening may be associated with the bottom side, as described above, but it may alternatively or additionally be associated with both the bottom side and the back side. In one embodiment, the back side creates a funnel like structure to direct and focus the suctioned particles into the lower channel for eventual deposit within the vacuum system.

In some embodiments, the opening and the aperture are the same. For example, the front side and the back side of the waste disposal bay may be opposing surfaces of a planar waste disposal bay where the opening on the back side is the same as the aperture on the front side with substantially little space separating the two.

Also depicted in FIG. 4 is switch 142. The switch 142 is a manually operated electromechanical switch that can be used to activate the motor of the vacuum system, and as the waste disposal bay containing a switch 130 is likely to be found on the floor, the switch 142 can preferably be switched between active and inactive states using a user's foot or other object such as a broom. The switch 142 can be manipulated with a user's hands, but by using the foot, it allows the user to remain upright.

In some embodiments, the switch may be proximate the waste disposal bay. As pictured in FIG. 4, the switch 142 may be proximate the waste disposal bay such that it is physically associated with the waste disposal bay. In other embodiments, the switch may be located next to or above the waste disposal bay. The switch may also be, in some embodiments, located a distance away from the waste disposal bay. For example, the switch may be a remote operated electromechanical switch.

In some embodiments, the switch may be used to activate the vacuum system motor to generate suction, and at the same (or substantially the same time) a timer is activated. The timer, upon reaching a calculated or predefined period of time, may deactivate the vacuum system. The timer may be a predefined period of time such as, for example, five or ten seconds. In some embodiments, the predefined time may be set by the manufacturer or by the user. The timer may also be a calculated amount of time. In one embodiment, the calculated time the motor will remain active is based on an amount and/or density of particles tracked through the lower channel, the attachment mechanism, and/or the upper channel. When a threshold density of particles is reached, the switch may deactivate the motor.

The switch may also be, in some embodiments, a photoelectric sensor such as a through beam, retro-reflective, or proximity sensor. As an example embodiment of the through beam sensor, a beam of light (e.g., infrared) is emitted from a switch located above and/or across the waste disposal bay to a receiver, and when the beam is interrupted, for example by a user's foot, the vacuum system motor is activated.

As an example embodiment of a retro-reflective sensor, one or more light reflectors positioned above and below (and/or on the sides) of the waste disposal bay are configured to bounce the light from the emitter to the receiver in a zigzag fashion in front of the waste disposal bay such that when the receiver fails to receive the light signal (e.g., a user's foot passes between any one of the reflected beams), the switch may activate the vacuum system motor.

As an example implementation of the proximity sensor, light (e.g., infrared) is transmitted from a switch at the waste disposal bay, and upon receipt of reflected light, the switch is activated. This may occur, for instance, when a user passes near the waste disposal bay with their body and/or broom. In any of the foregoing examples of photoelectric sensors, the motor of the vacuum system activates in a fashion that may be perceived as "automatic."

In some embodiments, the vacuum system motor may activate only when the attachment mechanism is maintaining fluid connection between the upper and lower channels, regardless of whether the switch has been activated.

Referring now to FIG. 5, illustrated is a schematic representation of an attachment mechanism 150 according to one implementation of the present disclosure. The attachment mechanism 150 comprises a seal 152 and cavity 154. The attachment mechanism may be the same or different structure as attachment mechanism 110 of FIGS. 1 and 2, and any reference to one should be considered, where applicable, to the other.

Figure 6:
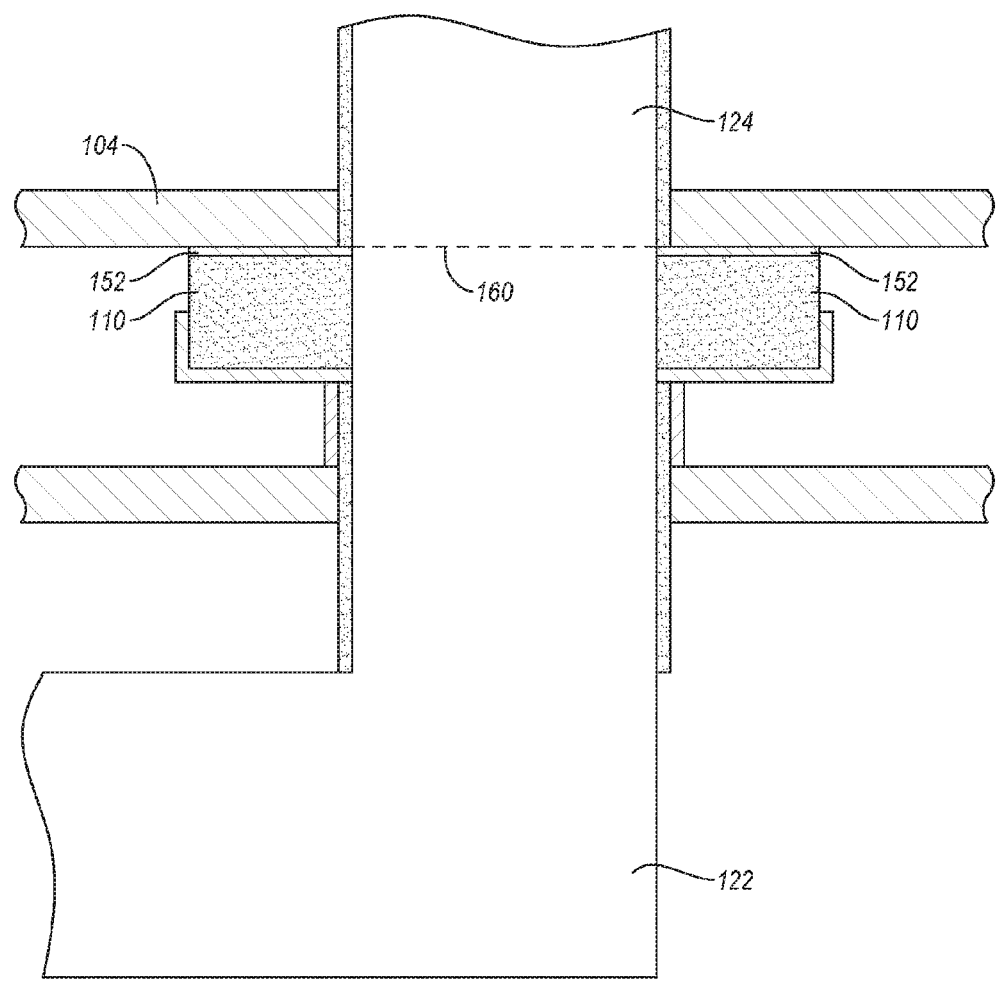
FIG. 6 illustrates a cross-sectional profile view of a portion of a system for transporting and collecting waste where the attachment mechanism is maintaining fluid communication between the waste disposal bay and the vacuum system according to one implementation of the present disclosure.

One embodiment of the attachment mechanism depicted in FIG. 5 may be illustrated with specific reference to FIG. 6. Depicted therein is a cross-sectional profile view of a portion of a system for transporting and collecting waste where the attachment mechanism 110 is configured to maintain fluid communication between the waste disposal bay (more specifically the opening of the waste disposal bay) and the vacuum system according to one implementation of the present disclosure. As depicted in FIG. 6, attachment mechanism 110 is maintaining fluid communication between the lower channel 122 and the upper channel 124, which in an embodiment, is the same as indicating the attachment mechanism 110 is maintaining fluid communication between the opening of the waste disposal bay and the vacuum system as there are no obstructions between said points. As depicted in FIG. 6, the lower channel 122 and upper channel 124 are substantially aligned. This may, in some embodiments, correlate with the first position observed and discussed with respect to FIG. 2B.

The attachment mechanism 110 depicted in FIG. 6 includes a seal 152 that compresses against the movable receptacle 104 and/or channel 124 to create a substantially airtight seal between the upper and lower channels 124 and 122. In one embodiment, the seal may bridge any discontinuity between the upper and lower channels to create an airtight seal.

Depicted in FIG. 6 is hashed line 160 indicating a potential discontinuity plane between the upper channel 124 and the lower channel 122. In one embodiment, the movable receptacle 104 may translocate away from its depicted position (i.e., the first position) into a second position where the alignment of channels 122 and 124 disrupts the substantially airtight seal. The substantially airtight seal may be broken as the movable receptacle translocates from a first position to a second position and reformed as the movable receptacle translocates from a second position back to a first position.

Also depicted in FIG. 6, attachment mechanism 110 surrounds a portion of the lower channel 122 adjacent to the upper channel 124. The lower channel may be, in some embodiments, a pipe and/or tube with the attachment mechanism and/or seal securely fitted around the circumference thereof. In some embodiments, the attachment mechanism and/or seal may stretch around the lower channel to create a snug fit.

The attachment mechanism and/or seal may be constructed from rubber(s), elastomer(s), thermoplastic(s), thermoplastic elastomer(s), and combinations thereof, and the properties of the material(s) used in the attachment mechanism may affect the fitting means. In some embodiments, the seal is a gasket, diaphragm, inner tube, a magnetically coupled seal, or O-ring associated with the attachment mechanism. As an example, the aforementioned magnetically coupled seal includes any means by which two surfaces of the attachment mechanism may be forced together using magnets to form a seal. This may be accomplished, for example, by having two substantially flat, opposing surfaces (e.g., the upper surface of the lower channel and the lower surface of the upper channel) associated with magnets such that when the two surfaces are substantially aligned, they are held together by magnetic forces to form a substantially airtight seal.

In some embodiments, the cavity 154 depicted in FIG. 5 is associated with the outside of the lower channel. In some embodiments, the attachment mechanism is fitted within the lower channel with the seal extending out over the top most edge of the lower channel. Regardless of the configuration of the attachment mechanism with the lower and/or upper channel, the attachment mechanism may be fixedly attached thereto through use of an epoxy, glue, tape, cement, or other adhesive.

The attachment mechanism depicted in FIG. 6 is one embodiment of an attachment mechanism that falls within the scope of the present disclosure. Additional embodiments will be enumerated and expanded upon in the forthcoming disclosure, all of which fall within the scope of the present disclosure and are in no way meant to limit the scope of the present disclosure. Rather, the forthcoming embodiments are exemplary in nature and should be construed as adding to the general understanding of the disclosure without limiting it to the specific embodiments described.

In one embodiment, a pipe may be connected to the opening of the back side of the waste disposal bay and to the vacuum system. The pipe may be discontinuous at a point between the opening and the vacuum system such that the discontinuity creates two or more pipe segments. The discontinuity may be bridged by an attachment mechanism having a seal configured to maintain fluid communication between the opening of the back side of the waste disposal bay and the vacuum system.

In one embodiment, the attachment mechanism includes a flexible hose where the flexible hose maintains a substantially airtight seal between the lower channel and the upper channel. This may be the result of two separate seals, one seal between the lower channel and the hose and one seal between the hose and the upper channel. The intervening hose may be of substantial length so as to maintain the substantially airtight seal as the movable container traverses between a closed and/or recessed position within the enclosure and an open and/or extended position within the enclosure.

In one embodiment, the attachment mechanism may be held in place around the lower channel by supports that prevent the attachment mechanism and/or the seal associated with the attachment mechanism to slide and/or move away from its position upon lateral movements of the movable receptacle.

In one embodiment, a first portion of the attachment mechanism may be associated with the lower channel and a second portion of the attachment mechanism may be associated with the upper channel and/or the movable receptacle such that when the movable receptacle is in a first position, the first and second portions interact in such a way as to create a substantially airtight seal, and when the movable receptacle traverses into a second position, the substantially airtight seal is broken.

For example, the attachment mechanism may be split into two complimentary halves, the first half being fixedly attached to the lower channel at a position distal from the movement of the moveable receptacle from a first position to a second position. Particularly, the first half may be positioned such that the movable receptacle moves away from the first half when it moves from a first position to a second position. The second half of the attachment mechanism may be fixedly attached to the underside of the movable receptacle such that when the movable receptacle is in the second position, the second half of the attachment mechanism is unassociated with the first half of the attachment mechanism yet still attached to the movable receptacle. Upon transition to the first position, the complimentary halves converge to form a substantially airtight seal.

In one embodiment, the attachment mechanism is secured to the upper channel and/or the movable receptacle such that when the leading edge of the upper channel passes the lower channel, a stretchable seal is engaged, and the movement of the movable receptacle acts to extend the stretchable seal over and/or between the upper channel and lower channel, forming a substantially airtight seal. In some embodiments the seal is hinged and/or linked.

In some embodiments, the attachment mechanism may be associated with the lower and/or upper channel and the substantially airtight seal formed as the movable receptacle, traveling on stationary rollers or the like, drops and/or engages through a gravitational force the upper channel upon the lower channel.

In some embodiments, the substantially airtight seal may be formed through means of a movable attachment mechanism. A push rod may be attached to the underside of the movable receptacle at a position that engages a lever in the first position, the lever moving an associated attachment mechanism into position such that it forms a substantially airtight seal when the movable receptacle is in a first position.

Though much of the disclosure has been focused on the attachment mechanism being associated with the lower channel, it may also be associated with the upper channel in any of the disclosed ways without departing from the scope and intent of the present disclosure.

In some embodiments, the vacuum system may be prone with the attachment mechanism bridging the discontinuity between the lower channel and at the vacuum system, itself. For example, the vacuum system may lie prone within a drawer (the drawer being a movable receptacle), and when pulled out the vacuum system is disconnected from the lower channel. When the drawer is pushed back in (i.e., returned to a first position), the vacuum system engages the attachment mechanism to reform an airtight seal and fluid communication between the lower channel and the vacuum system. In one embodiment, the drawer is a self-closing drawer that promotes a consistent reformation of a substantially airtight seal as it closes.

The lower channel may be of any diameter sufficient for transporting waste. For example, the lower channel is preferably 2 inches in diameter. In some embodiments, the diameter of the lower channel may be selected from a diameter within a range of 1.5-2.5 inches, within a range of 1-3 inches, within a range of 2-4 inches, within a range of 4-6 inches, within a range of 0.5-1.5 inches, within a range of 0.25-1 inches, or within a range of 0.25-6 inches. The upper channel may have a diameter within any of the foregoing ranges and may have the same or different diameter as the lower channel.

In some embodiments, a light, other visual display, or an audible alarm may be used to indicate that waste should be emptied from the removable storage container. This may be determined by pressure drop within the system. For example, as the pressure drop through the system increases (with increasing debris collected) the air flow rate and the suction at the waste disposal bay will decrease. Pressure drop can be measured, and a signal can be triggered to indicate when the pressure has dropped below a predefined or calculated threshold.

The foregoing systems may be applied to residential settings, particularly within kitchens of residential settings. However, they may also be applied to commercial and/or industrial settings. The systems utilized in industrial and/or commercial spaces may be larger than would otherwise be commonly accommodated within a residential setting. For example, a factory may have a waste transportation and collection system that comprises a waste disposal bay and aperture wide enough to accept debris swept into it by a user using a push broom. The size of the vacuum system, the size of the waste disposal bay, the diameter of the lower and upper channels, and the volume of the removable containers for collecting waste may vary depending on their application. Residential systems may be smaller than industrial and/or commercial systems.

EXAMPLE 1

The following waste removal properties may describe one or more embodiment of the present invention and are based on a system configured as depicted in FIGS. 1 and 2. As is well understood in the art, the settling velocity of a particle defines its ability to be conveyed in air. Settling velocity can be calculated from:

$$v_s = \frac{2}{9} \frac{\rho_p - \rho_f}{\mu} g R^2,$$

where $v_s$ is the settling velocity, $\rho_p$ is the particle density, $\rho_f$ is the fluid density, $\mu$ is the dynamic viscosity, g is the gravitational constant, and R is the radius of the particle. Given a consistent set of units, air as the fluid, and particle density of about 2.5 (average for gravel), the settling velocity of a 1 cm diameter particle is about 23 meters/second (75 ft/sec). Thus, 23 msec (75 ft/sec) velocity is likely sufficient to convey such a particle in air.

In a two-inch diameter pipe, a flow rate of about 100 ft$^3$/minute (CFM) is sufficient to achieve 23 msec (75 ft/sec) velocity. A vacuum motor configured to produce an airflow rate of about 100 CFM was selected. However, the actual flow rate is dependent upon the pressure drop through the apparatus, and when operating, the pressure drop through the apparatus was about 13 inches of water.

The foregoing system was tested to determine whether it produced sufficient suction. Gravel was screened to recover a +4 mesh screen size (roughly 0.4 cm in diameter or about 0.157 inches). The actual size of the screened gravel ranged from roughly 0.5 to 1.5 cm (or about 0.197 to 0.591 inches) in diameter. A plurality of said gravel was placed near the waste disposal bay and the system activated. The gravel was readily picked up at the waste disposal bay, including the largest size (1.5 cm or about 0.591 inch diameter).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A system for transporting and collecting waste, comprising:
    a waste disposal bay comprising:
        a front side, wherein the front side extends vertically away from a floor and comprises an aperture;
        a bottom side, wherein the bottom side is substantially level with the floor; and
        a back side substantially opposite the front side, wherein the back side is disposed adjacent to the bottom side and extends a distance away from the bottom side, the back side including an opening;
    a movable receptacle positioned above the waste disposal bay, the movable receptacle configured to translocate from a first position to a second position and from the second position to the first position and wherein the movable receptacle comprises a through hole;
    a vacuum system associated with the through hole of the movable receptacle, the vacuum system comprising:
        a motor for generating suction; and
        a removable container for collecting waste;
    an attachment mechanism between the opening of the back side of the waste disposal bay and the through hole, wherein the attachment mechanism is configured to maintain fluid communication between the opening and the vacuum system when the movable receptacle is in the first position; and
    a switch configured to activate the motor.

2. The system as in claim 1, wherein the attachment mechanism is a pipe connected to the opening and the vacuum system.

3. The system as in claim 2, wherein the pipe is discontinuous at a point between the opening and the vacuum system, and the discontinuity is bridged by a substantially airtight seal.

4. The system as in claim 3, wherein the substantially airtight seal is selected from the group consisting of a gasket, a diaphragm, an inner tube, a magnetically coupled seal, and an O-ring.

5. The system as in claim 3, wherein the substantially airtight seal is comprised of material selected from the group consisting of: rubbers, elastomers, thermoplastics, and thermoplastic elastomers.

6. The system as in claim 3, wherein the movable receptacle comprises a slidable shelf within a cabinet and wherein the discontinuity is bridged by the substantially airtight seal when the slidable shelf is in the first position and the substantially airtight seal is broken when the slidable shelf is in the second position.

7. The system as in claim 1, wherein the removable container is one or more particle collectors selected from the group consisting of a vacuum bag, an electrostatic precipitator, a cyclone separator, and a drop out container.

8. The system as in claim 1, wherein the aperture comprises substantially the entire front side.

9. The system as in claim 1, wherein the switch activates the vacuum system and a timer, wherein the timer deactivates the vacuum system after a period of time.

10. The system as in claim 1, wherein the switch comprises a manually operated electromechanical switch.

11. The system as in claim 1, wherein the switch is proximate the waste disposal bay.

12. The system as in claim 10, wherein the switch comprises a photoelectric sensor.

13. The system as in claim 12, wherein the switch is a proximity sensor.

14. A system for transporting and collecting waste, comprising:
    a waste disposal bay comprising:
        a front side, wherein the front side extends vertically away from a floor and comprises an aperture;
        a bottom side, wherein the bottom side is substantially level with the floor; and
        a back side substantially opposite the front side, wherein the back side is disposed adjacent to the bottom side and extends a distance away from the bottom side, the back side including an opening;
    a vacuum system comprising:
        a motor for generating suction; and
        a removable container for collecting waste;
    a pipe connected to the opening of the back side of the waste disposal bay and to the vacuum system, wherein the pipe is discontinuous at a point between the opening and the vacuum system, creating two or more pipe segments, and wherein the discontinuity is bridged by a seal configured to maintain fluid communication between the opening and the vacuum system; and
    a switch configured to activate the motor.

15. The system as in claim 14, wherein the aperture is selectively open.

16. The system as in claim 14, wherein the aperture is opened by suction generated by the motor.

17. The system as in claim 14, wherein the front side and the back side are opposing surfaces of a planar waste disposal bay.

18. The system as in claim 14, wherein the seal is broken when the two or more pipe segments are misaligned, and the seal is reformed when the two or more pipe segments are substantially aligned.

19. The system as in claim 14, wherein the switch is selected from the group consisting of photoelectric sensors and manually operated electromechanical switches.

20. A kit for collecting and transporting waste, comprising:
    a waste disposal bay comprising:
        a front side, wherein the front side extends vertically away from a floor and comprises an aperture;
        a bottom side, wherein the bottom side is substantially level with the floor; and
        a back side substantially opposite the front side, wherein the back side is disposed adjacent to the bottom side and extends a distance away from the bottom side, the back side including an opening;

a vacuum system configured to be associated with a movable receptacle, wherein the movable receptacle comprises a through hole configured to be associated with the vacuum system, and wherein the movable receptacle is configured to translocate from a first position to a second position and from the second position to the first position, the vacuum system comprising:
  a motor for generating suction; and
  a removable container for collecting waste; and
an attachment mechanism between the opening of the back side of the waste disposal bay and the through hole, wherein the attachment mechanism is configured to maintain fluid communication between the opening and the vacuum system when the movable receptacle is in the first position; and
a switch configured to activate the motor.

* * * * *